Nov. 6, 1962     K. STEISSLINGER     3,062,113
CONTROL MECHANISMS FOR PHOTOGRAPHIC CAMERAS
Filed July 27, 1961     2 Sheets-Sheet 1
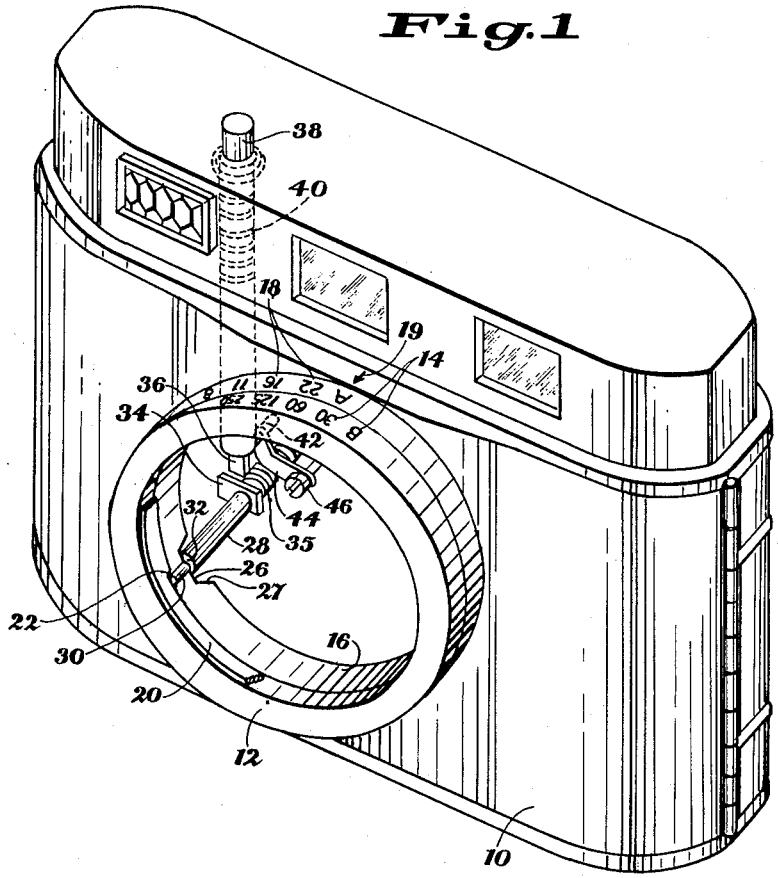
*Kurt Steisslinger*
INVENTOR.
BY
ATTORNEYS Nov. 6, 1962 K. STEISSLINGER 3,062,113
CONTROL MECHANISMS FOR PHOTOGRAPHIC CAMERAS
Filed July 27, 1961 2 Sheets-Sheet 2

Kurt Steisslinger
INVENTOR.

BY R. Frank Smith
Robert W. Hampton
ATTORNEYS 3,062,113
CONTROL MECHANISMS FOR PHOTOGRAPHIC CAMERAS
Kurt Steisslinger, Stuttgart-Hedelfingen, Germany, assignor to Eastman Kodak Company, Rochester, N.Y.
Filed July 27, 1961, Ser. No. 127,344
Claims priority, application Germany Sept. 9, 1960
3 Claims. (Cl. 95—10)

The present invention relates to photographic cameras having photoelectric, or automatic exposure control and manually adjustable diaphragm and shutter setting members, and more particularly concerns means for blocking shutter release when the two setting members are in certain adjusted positions or combinations of adjusted positions.

Various cameras in the prior art have automatic diaphragm control, an alternative manual adjustment of the diaphragm, and a manually adjustable shutter with a range of "instantaneous" operating speeds and a "Bulb" operation. The present invention relates to such cameras, wherein the mode of operation of the diaphragm is controlled by a manually settable member having a first position for selecting photoelectric or automatic exposure control and a range of other positions for manually preselecting a desired diaphragm opening.

It is a primary object of the invention to prevent the actuation of a camera of the above type when the shutter setting member is adjusted to its "Bulb" position and, at the same time, the diaphragm setting member is adjusted to its position for selecting automatic diaphragm control.

Another object of the invention is to block actuation of such a camera when the diaphragm setting member is between its position for selecting automatic diaphragm control and its closest position for selecting manual diaphragm control.

Another object of the invention is to block actuation of such a camera when its manually adjustable diaphragm and shutter setting members are in a predetermined combination of adjusted positions.

Other objects of the invention will appear from the following description, reference being made to the accompanying drawings, wherein:

FIG. 1 is an isometric view of a camera, illustrating the invention when the diaphragm setting ring is in its position for selecting automatic diaphragm control and the shutter setting ring is in its range of "instantaneous" shutter speeds;

Figure 3:
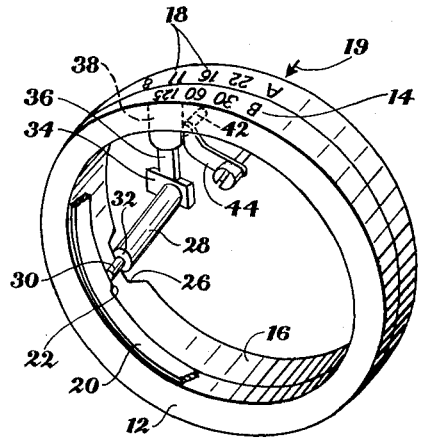
Figure 4:
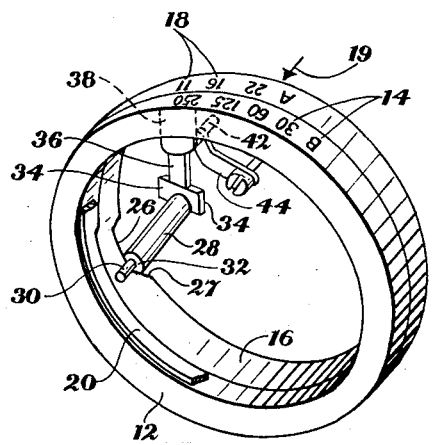

FIG. 3 is an isometric view of a portion of the mechanism shown in FIG. 1, illustrating the operation of the mechanism when the shutter speed setting ring is in its "Bulb" position and the diaphragm setting ring is in its "Automatic" position; and FIG. 4 is an isometric view of a portion of the mechanism shown in FIG. 1, illustrating the operation of the mechanism when the diaphragm setting ring is between its "Automatic" position and the closest position for a manually selected diaphragm opening.

Referring to FIG. 1, a camera embodying the present invention comprises a cover 10, on the front of which are mounted a shutter speed setting ring 12 and a diaphragm setting ring 16. Ring 12 has a shutter speed scale 14 indicating "Bulb" operation at "B," and "instantaneous" operation at selected shutter speed such as "30," "60," etc. Ring 16 carries a scale 18 indicating photoelectric, or automatic exposure control at "A" and manually selectable diaphragm openings at "22," "16," etc., representing the respective diaphragm stops f/22, f/16, etc. The various indicia on scales 14 and 18 cooperate with a fixed index mark 19 on the camera body to indicate the manually selected shutter speed or mode and the manually selected diaphragm opening or mode. The shutter and diaphragm setting rings, their respective scales, as well as the respective shutter and diaphragm mechanisms controlled by these rings, are well known in the art and are disclosed, for example, in U.S. Patent 2,969,004.

When ring 16 is adjusted to the position where the symbol "A" is opposite index mark 19, the camera is adjusted for photoelectric or automatic diaphragm control as disclosed fully, for example, in the above mentioned U.S. patent. FIG. 1 illustrates the operation of the invention with the diaphragm ring 16 adjusted to "A" and the shutter ring adjusted to its "instantaneous" range.

A cam 20 having a ramp 22 is mounted on the inner surface of the shutter setting ring 12. The diaphragm ring 16 has a cam surface comprising a notch 26 with a ramp 27. The cam surfaces on rings 12 and 16 cooperate, respectively, with a terminal pin 30 and a shoulder 32 of a control member 28. A blocking member 34 is mounted on control member 28 and together with the control member is urged forward in the camera by a spring 35. In one position of control member 28, its blocking member 34 underlies a tip 36 of a camera actuating member 38, which is normally maintained in an upper position by a spring 40 and has a pin 42 cooperating with a shutter release member 44, pivoted at 46.

When rings 12 and 16 are in the respective range and position shown in FIG. 1, pin 30 is counterclockwise from ramp 22, i.e., it cooperates with a thinner portion of cam 20, while shoulder 32 cooperates with the notch 26 in ring 16. This permits the control member 28 to be in its forward position in the camera, thereby placing the blocking member 34 forward of tip 36 of the actuating member 38. Therefore, manual depression of member 38 against the tension of spring 40 permits pin 42 to rock the shutter release member 44 and trip the shutter in the manner well known in the art.

Figure 2:
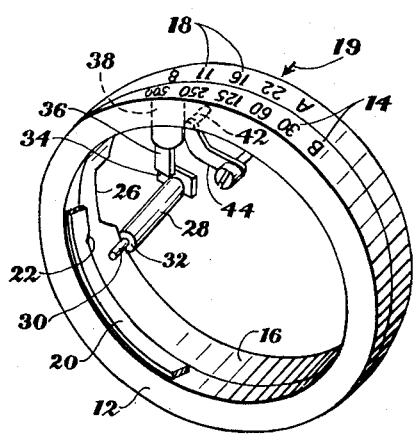
FIG. 2 is an isometric view of a portion of the mechanism shown in FIG. 1, illustrating the operation of the mechanism when the shutter speed setting ring is in its "instantaneous" range and the diaphragm setting ring is in its range for a manually selected diaphragm opening.

Referring to FIG. 2, when the diaphragm ring 16 is adjusted to its range for manual diaphragm selection, shoulder 32 of control member 28 is raised out of notch 26 and thereby holds the blocking member 34 to the rear of the tip 36 of actuating member 38. This also permits the actuating member to trip the shutter.

When the diaphragm ring is set to "A," the shutter ring may be adjusted to any of its positions. However, only the "instantaneous" positions of the shutter are desirable with automatic diaphragm control, because the "B" or "Bulb" position of the shutter ring permits the camera operator to mentally determine the exposure time, which then has no fixed relation to the automatically adjusted diaphragm.

Referring to FIG. 3, when the shutter and diaphragm setting members 12 and 16 are adjusted to their respective "B" and "A" positions, indicating the selection of "Bulb" operation of the shutter and automatic control of the diaphragm, ramp 22 of cam 20 is moved under pin 30 to force the control member 28 slightly to the rear in the camera. However, shoulder 32 is opposite notch 26 in ring 16. Therefore, member 28 is moved just far enough to the rear to place blocking member 34 in the path of tip 36 of actuating member 38. Consequently, pin 42 is unable to move sufficiently downward in the camera for tripping the shutter release member 44, and shutter release is therefore prevented.

Referring to FIG. 4, when the diaphragm setting ring 16 has been moved to a position between that for selecting automatic diaphragm control and the closest position for manually selecting the diaphragm opening, a part of ramp 27 on ring 16 underlies shoulder 32 of the control member 28, thereby forcing blocking member 34 sufficiently rearwardly in the camera to underlie the tip 36 of actuating member 38 for preventing shutter release in the manner described above. It will be seen that when ring 16 is in this position the adjustment of ring 12 is immaterial.

The invention has been described in detail with particular reference to preferred embodiments thereof, but it will be understood that variations and modifications can be effected within the spirit and scope of the invention as described hereinabove and as defined in the appended claims.

I claim:

1. In a camera having an actuating member manually movable in a predetermined path for actuating said camera, and having manually adjustable shutter and diaphragm setting members, said shutter setting member having a position for selecting "Bulb" shutter operation, and said diaphragm setting member having a range of positions for selecting manual diaphragm control and a position for selecting automatic diaphragm control, the combination comprising: first and second cam surfaces movable with said shutter and diaphragm setting members, respectively; a control member having first and second sensing surfaces in sensing relation with said first and second cam surfaces, respectively; a blocking member movable by said control member into the path of said actuating member (1) in response to adjustment of said diaphragm setting member to a position intermediate said range and said position for selecting automatic diaphragm control, and (2) in joint response to adjustment of said diaphragm setting member to its position for selecting automatic diaphragm control and adjustment of said shutter setting member to its position for selecting "Bulb" shutter operation.

2. In a camera having an actuating member manually movable in a predetermined path for actuating said camera, and having manually adjustable shutter and diaphragm setting members, said shutter setting member having a position for selecting "Bulb" shutter operation, said diaphragm setting member having a range of positions for selecting manual diaphragm control and a position for selecting automatic diaphragm control, the combination comprising: first and second cam surfaces movable with said shutter and diaphragm setting members, respectively; a control member having first and second sensing surfaces in sensing relation with said first and second cam surfaces, respectively; and a blocking member movable by said control member into the path of said actuating member in joint response to adjustment of said diaphragm setting member to its position for selecting automatic diaphragm control and adjustment of said shutter setting member to its position for selecting "Bulb" shutter operation.

3. In a camera having a member movable in a predetermined path for actuating said camera, and having a manually adjustable diaphragm setting member with a range of positions for selecting manual diaphragm control and a position for selecting automatic diaphragm control, the combination comprising: a cam surface movable with said diaphragm setting member; a control member having a sensing surface in sensing relation with said cam surface; and a blocking member movable by said control member into the path of said actuating member for blocking movement of the latter in response to adjustment of said diaphragm setting member to a position intermediate said range and said position.

References Cited in the file of this patent

UNITED STATES PATENTS

| | | |
|---|---|---|
| 2,969,004 | Gebele | Jan. 24, 1961 |
| 2,985,082 | Starp | May 23, 1961 |
| 2,990,758 | Sauer | July 4, 1961 |
| 2,993,422 | Rentschler | July 25, 1961 |